2,960,531

ADDITION OF CHLORARYLOXYACETIC ACID TO ALKENES IN THE PRESENCE OF BORON TRIFLUORIDE

John E. Franz, Crestwood, and Martin W. Farrar, Webster Groves, Mo., assignors to Monsanto Chemical Company, St. Louis, Mo., a corporation of Delaware No Drawing. Filed July 31, 1958, Ser. No. 752,173

10 Claims. (Cl. 260—473)

This invention relates to a novel process for the production of alkyl esters of chloraryloxyacetic acids by reacting an alkene with a chloraryloxyacetic acid in the presence of boron trifluoride.

It is known that acetic acid will react with an olefin such as propylene in the presence of sulfuric acid to provide alkyl acetates. However, it has been observed that this esterification process has limited application. For example, 1-alkenes such as propylene, when admixed with a chloraryloxyacetic acid in the presence of sulfuric acid, fail to provide the corresponding alkyl ester. In view of the widespread interest in alkyl esters of chloroaryloxyacetic acids, the art has constantly sought methods of preparing them from readily available, inexpensive raw materials in an efficient and economical manner.

In accordance with this invention, it has been found that alkyl esters of chloraryloxyacetic acids can be produced by reacting a chloraryloxyacetic acid with an alkene having the formula,

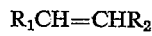

wherein $R_1$ and $R_2$ are selected from hydrogen and alkyl radicals, but both $R_1$ and $R_2$ are not hydrogen, and the sum of the carbon atoms of $R_1$ and $R_2$ is not more than 14, in the presence of boron trifluoride.

As illustrative of operable olefins are propene, 1-butene, 2-butene, 1-pentene, 2-pentene, 3-methyl-1-butene, 3-methyl-2-butene, 1-hexene, 2-hexene, 3-hexene, 4-methyl-1-pentene, 4-methyl-2-pentene, 4,4-dimethyl-1-butene, 1-heptene, 2-heptene, 3-heptene, 4-methyl-1-hexene, 3-ethyl-1-pentene, 1-octene, 2-octene, 3-octene, 3,4-dimethyl-1-hexene, 6-methyl-2-hexene, 1-nonene, 2-nonene, 3-nonene, 2,6-dimethyl-3-heptene, 4,6-dimethyl-1-heptene, 1-decene, 2-decene, 4-decene, 1-undecene, 2-undecene, 1-dodecene, 2-dodecene, 4,6,8-trimethyl-1-nonene, 4,6,8-trimethyl-2-nonene, 1-tetradecene and 1-hexadecene.

Among the chloroaryloxyacetic acid reactants contemplated, we prefer those of the structure,

wherein $n$ is a whole number and where R' is an aryl radical, such as phenyl, tolyl, ethylphenyl, xylyl, naphthyl, and the like, and preferably is an aryl radical containing 6 to 10 carbon atoms. As specifically illustrative of such reactants are o-chlorophenoxyacetic acid, 2,4-dichlorophenoxyacetic acid, 2,4,5-trichlorophenoxyacetic acid, 2,3,4,6-tetrachlorophenoxyacetic acid, pentachlorophenoxyacetic acid, 4-chloro-o-toloxyacetic acid, 4-chloro-m-toloxyacetic acid, 4-chloro-2-ethylphenoxyacetic acid, 4-chloro-3,5-dimethylphenoxyacetic acid, 2-chloro-1-naphthoxyacetic acid, 2,4-dichloro-1-naphthoxyacetic acid, and the like, and mixtures thereof.

In carrying out the process of this invention, the chloraryloxyacetic acid, either in crude or pure form, is dispersed or dissolved in a fluid organic medium, after which the catalyst is added to the mixture. In instances wherein the alkene reactant is a fluid, under the reaction conditions an excess thereof may be employed to provide the fluid medium, and, if desirable, an inert organic liquid may be admixed therewith. However, when the alkene reactant is a gas or a low-boiling liquid, the chloraryloxyacetic acid reactant is dispersed in an inert organic liquid medium. Ordinarily temperatures in the range of about 20° C. to 150° C. provide optimum results, although other temperatures can be used.

The following non-limiting examples further illustrate the process of our invention.

*Example 1*

To a suitable reaction vessel containing, as a reaction medium, 238 parts by weight of carbon tetrachloride, there were added 28 parts by weight of 2,4-dichlorophenoxyacetic acid. While agitating the resulting mixture at room temperature, gaseous boron trifluoride catalyst was added until 8.5 parts by weight thereof were absorbed. To the agitating mass, gaseous propylene was added over a period of about 5 hours while maintaining the temperature between 30° C. and 45° C. The solution was poured over ice and washed with water. The organic layer was separated, washed with aqueous potassium carbonate and then with water. The organic layer was removed, dried over magnesium sulfate and subjected to vacuum distillation to remove the solvent. The residue, 33.8 parts by weight (corresponding to a 100% yield, was the isopropyl ester of 2,4-dichlorophenoxyacetic acid.

*Example 2*

Employing the procedure of Example 1, but replacing 2,4-dichlorophenoxyacetic acid with an equimolecular amount of 2,4,5-trichlorophenoxyacetic acid, an excellent yield of the isopropyl ester of 2,4,5-trichlorophenoxyacetic acid was obtained.

*Example 3*

Employing the procedure of Example 1, but replacing 2,4-dichlorophenoxyacetic acid with an equimolecular amount of 4-chloro-o-toloxyacetic acid, an excellent yield of the isopropyl ester of 4-chloro-o-toloxyacetic acid was obtained.

*Example 4*

Employing the procedure of Example 1, but replacing propylene with an equimolecular amount of 1-octene and using a reaction temperature of about 90–100° C., there was obtained the 1-methylheptyl ester of 2,4-dichlorophenoxyacetic acid.

*Example 5*

Employing the procedure of Example 1, but replacing propylene with an equimolecular amount of 1-dodecene and using a reaction temperature of about 105–115° C., there was obtained the 1-methylundecyl ester of 2,4-dichlorophenoxyacetic acid.

In place of carbon tetrachloride, other inert organic liquids may be employed as the reaction medium, e.g., ethylene dichloride, tetrachloroethylene, petroleum ether, trichlorobenzene, and the like. By "inert organic liquid" is meant an organic liquid which is substantially unreactive under the conditions of the esterification reaction.

While gaseous boron trifluoride is preferred, the boron trifluoride may be incorporated into the reaction in the form of ether derivatives thereof (e.g., the compounds of boron fluoride with diethyl ether, a dipropyl ether, or ethylpropyl ether), or as boron trifluoride dihydrate, or as dihydroxyfluoroboric acid, etc.

The amount of catalyst will vary depending upon the reactants, temperature, time of reaction, agitation, and the like. While, in general, a catalytic amount is contemplated, ordinarily 0.5 to 2 mols of catalyst per mol of chloraryloxyacetic acid will provide optimum results.

While this invention has been described with respect to certain embodiments, it is not so limited, and it is to be understood that variations and modifications thereof, e.g., employment of pressures above or below atmospheric, obvious to those skilled in the art may be made without departing from the spirit or scope of this invention.

This application is a continuation-in-part of our co-pending application, Serial No. 586,907, filed May 24, 1956, now abandoned.

What is claimed is:

1. A method of making an alkyl ester of a chloraryl-oxyacetic acid which comprises reacting an alkene having the formula, $$R_1CH=CHR_2$$

wherein $R_1$ and $R_2$ are selected from hydrogen and alkyl radicals, but both $R_1$ and $R_2$ are not hydrogen, and the sum of the carbon atoms of $R_1$ and $R_2$ is not more than 14 with a chloraryloxyacetic acid of the structure, $$Cl_n\text{---}R'\text{---}O\text{---}CH_2COOH$$

wherein $n$ is a whole number and $R'$ is an aromatic hydrocarbon radical having 6 to 10 carbon atoms, in an organic liquid medium in the presence of boron trifluoride.

2. The method of making an alkyl ester of a chloraryl-oxyacetic acid which comprises reacting an alkene of the structure, $$R_1CH=CHR_2$$

wherein $R_1$ and $R_2$ are selected from the hydrogen and alkyl radicals, but both $R_1$ and $R_2$ are not hydrogen, and the sum of the carbon atoms of $R_1$ and $R_2$ is not more than 14, with a chloraryloxyacetic acid of the structure, $$Cl_n\text{---}R'\text{---}O\text{---}CH_2COOH$$

wherein $n$ is a whole number, and where $R'$ is an aromatic hydrocarbon radical having 6 to 10 carbon atoms, in an organic liquid medium at a temperature in the range of about 20° C. to 150° C. and in the presence of boron trifluoride.

3. The process of claim 1 wherein the chloraryloxyacetic acid is 2,4-dichlorophenoxyacetic acid.

4. The process of claim 1 wherein the chloraryloxyacetic acid is 2,4,5-trichlorophenoxyacetic acid.

5. The process of claim 1 wherein the chloraryloxyacetic acid is 4-chloro-o-toloxyacetic acid.

6. The process of claim 1 wherein the alkene reactant is propylene.

7. The process of claim 1 wherein the alkene reactant is octylene.

8. The process of claim 6 wherein the chloraryloxyacetic acid is 2,4-dichlorophenoxyacetic acid.

9. The process of claim 6 wherein the chloraryloxyacetic acid is 2,4,5-trichlorophenoxyacetic acid.

10. The process of claim 6 wherein the chloraryloxyacetic acid is 4-chloro-o-toloxyacetic acid.

References Cited in the file of this patent

UNITED STATES PATENTS

| | | |
|---|---|---|
| 2,335,652 | D'Alelio | Nov. 30, 1943 |
| 2,533,938 | Jenner | Dec. 12, 1950 |

OTHER REFERENCES

Dorris et al.: J. Am. Chem. Soc., 56, 2689–2690 (1934).

Wagner et al.: "Synthetic Organic Chemistry," page 491, J. Wiley, 1953.